United States Patent
Yamaguchi et al.

(10) Patent No.: US 6,843,413 B2
(45) Date of Patent: Jan. 18, 2005

(54) INFORMATION PROVIDING METHOD AND INFORMATION PROVIDING DEVICE

(75) Inventors: Tomohisa Yamaguchi, Tokyo (JP); Tsugihiko Ohno, Tokyo (JP); Norihito Takatori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/399,164

(22) PCT Filed: Sep. 7, 2001

(86) PCT No.: PCT/JP01/07771

§ 371 (c)(1),
(2), (4) Date: Apr. 14, 2003

(87) PCT Pub. No.: WO03/023622

PCT Pub. Date: Mar. 20, 2003

(65) Prior Publication Data

US 2004/0015560 A1 Jan. 22, 2004

(51) Int. Cl.[7] ................................. G06K 5/00
(52) U.S. Cl. ..................... 235/382; 235/285
(58) Field of Search ................. 235/382, 379, 235/380, 385, 451, 462.46, 487, 492

(56) References Cited

U.S. PATENT DOCUMENTS 5,987,438 A * 11/1999 Nakano et al. ............. 705/41
6,070,148 A * 5/2000 Mori et al. ................ 705/26
6,123,259 A    9/2000 Ogasawara
6,304,248 B1 * 10/2001 Shiobara et al. ........... 345/163

FOREIGN PATENT DOCUMENTS

| EP | 1 117 068 A1 | 7/2001 |
|---|---|---|
| JP | 11-175017 A | 7/1999 |
| JP | 2000-30148 A | 1/2000 |
| JP | 2000-165536 A | 6/2000 |
| JP | 2000-259798 A | 9/2000 |
| JP | 2001-005920 A | 1/2001 |
| JP | 2001-160105 A | 6/2001 |

* cited by examiner

*Primary Examiner*—Daniel Stcyr
(74) *Attorney, Agent, or Firm*—Birch, Stewart, Kolasch & Birch, LLP

(57) ABSTRACT

This invention relates to a method for providing information by using a contactless IC (integrated circuit) card and a device for providing information. It is an object of this invention to obtain mass data and data created dynamically, and also to solve troublesome work of updating data in the contactless IC card. Data 9 of location information for accessing data 8 of external information are stored in a contactless IC card 7. A device 10 for providing information reads the data 9 of location information and accesses the data 8 of external information based on the data 9 of location information read.

11 Claims, 7 Drawing Sheets

CELLULAR PHONE WITH FUNCTION OF ACCESSING CONTACTLESS IC CARD AND FUNCTION OF ACCESSING INTERNET

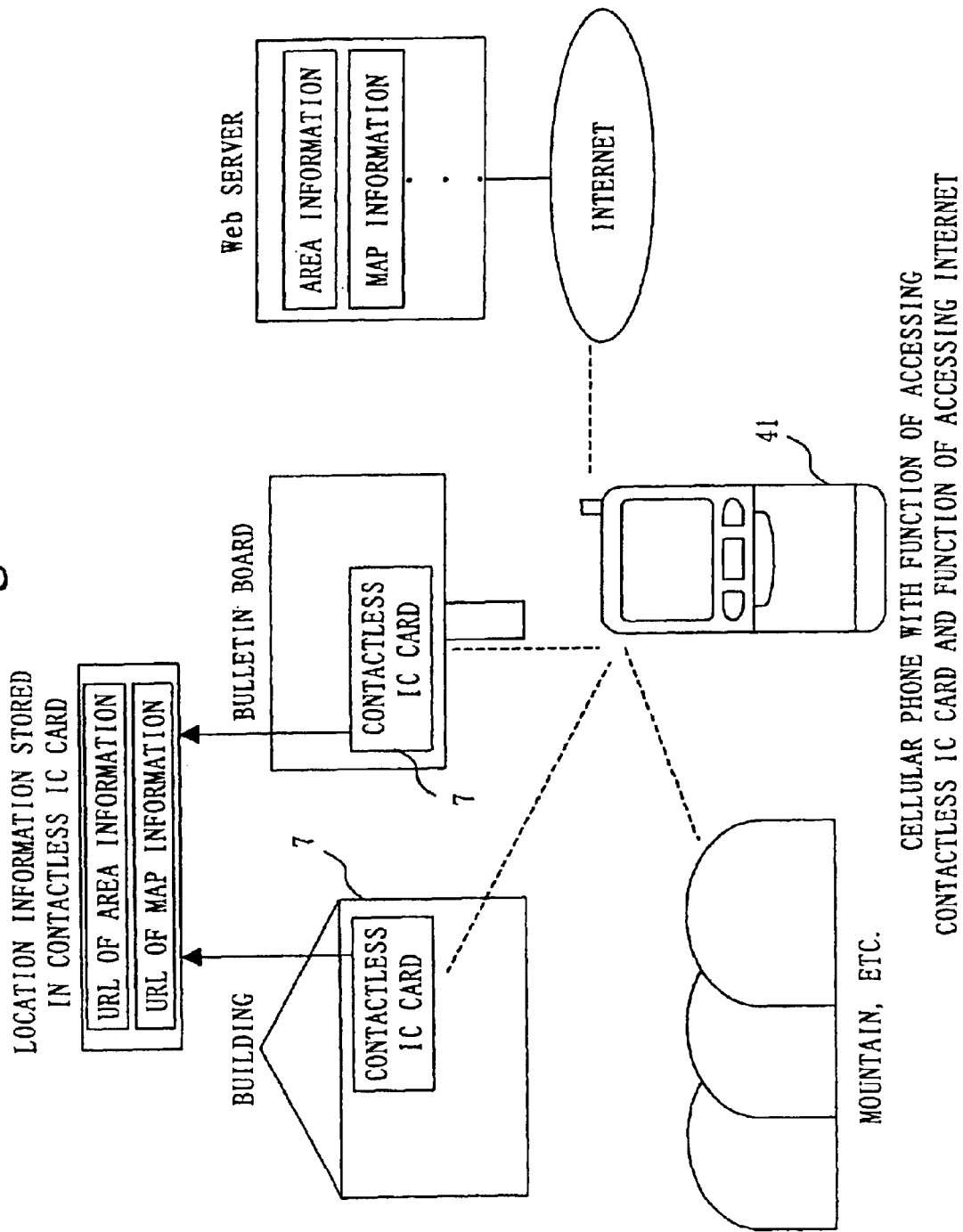

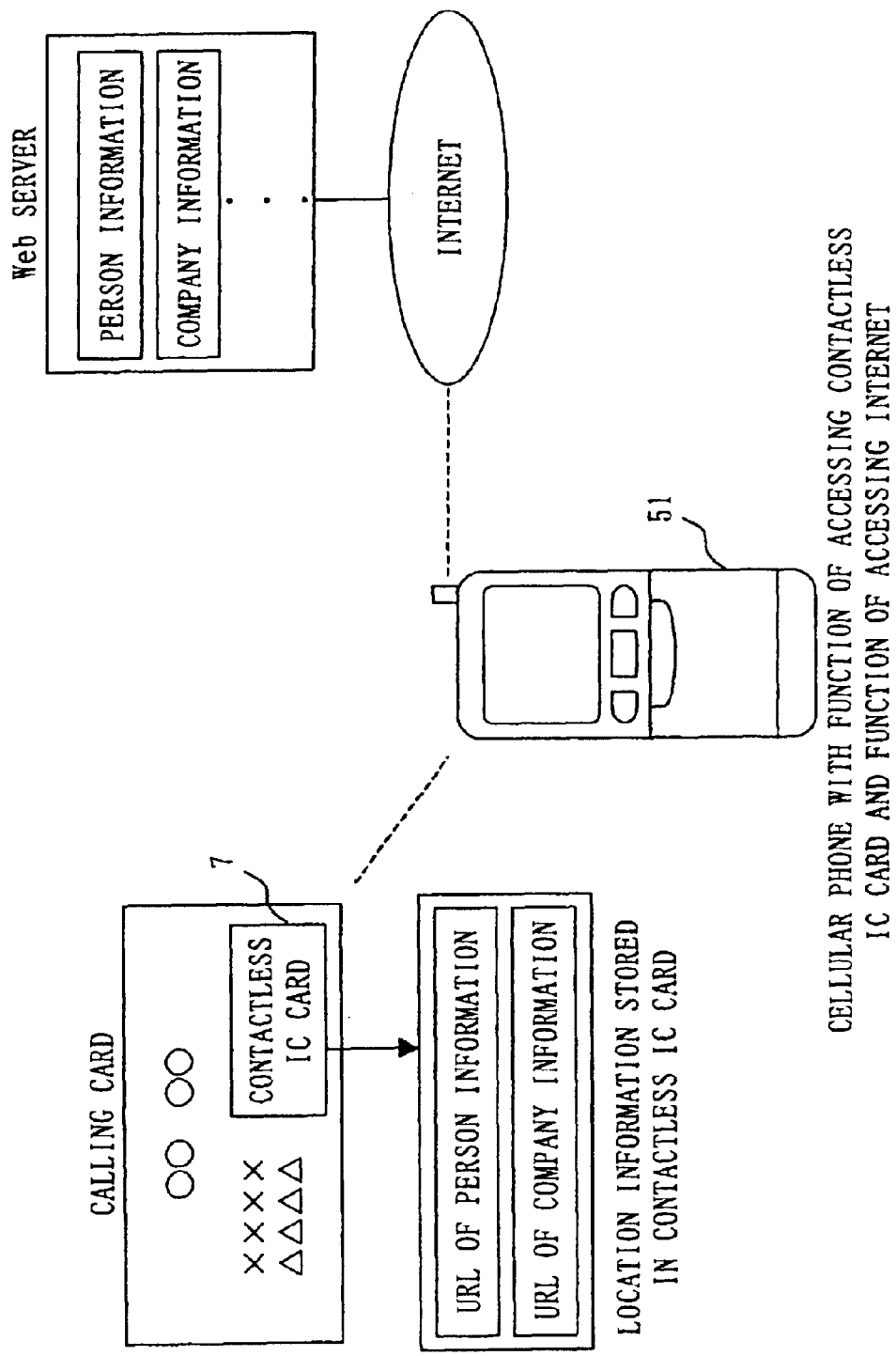

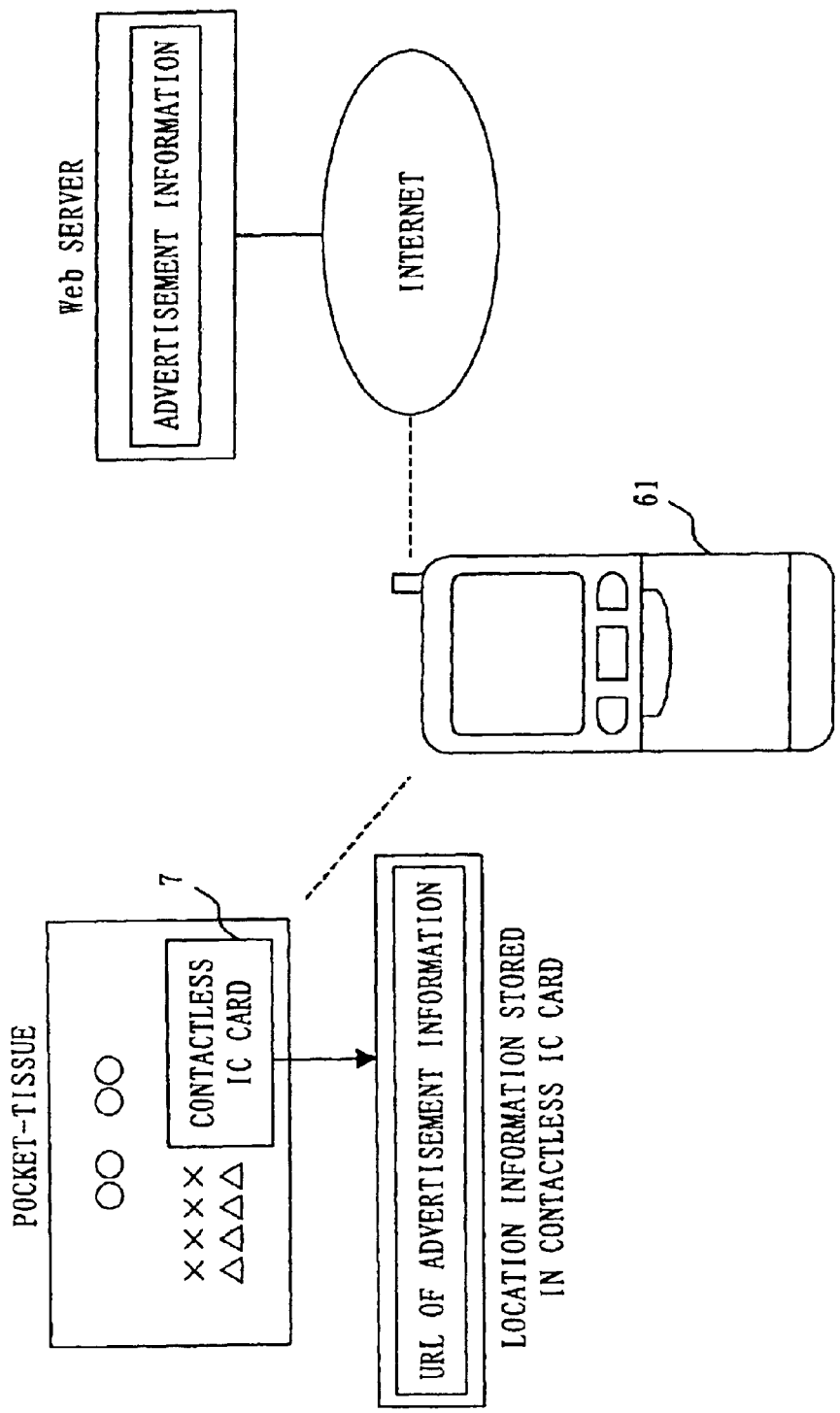

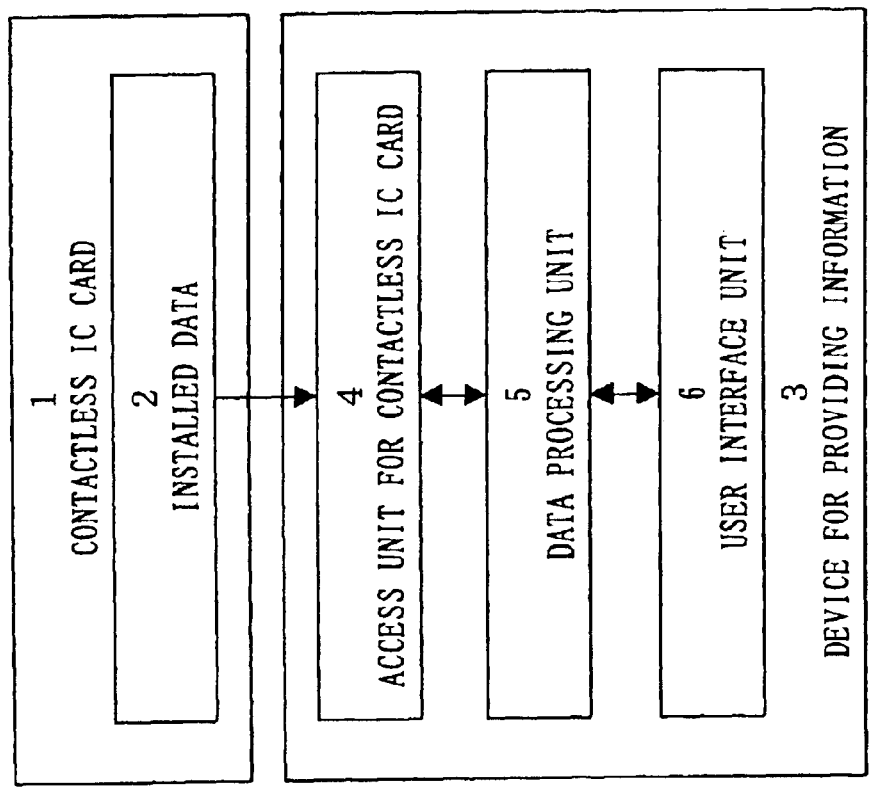

INFORMATION PROVIDING METHOD AND INFORMATION PROVIDING DEVICE

This application is the national phase under 35 U.S.C. §371 of PCT International Application No. PCT/JP01/07771 which has an International filing date of Sep. 7, 2001, which designated the United States of America.

TECHNICAL FIELD

This invention relates to a method for providing various information for a user by using a contactless IC (integrated circuit) card.

BACKGROUND ART

FIG. 7 illustrates a configuration of an information access system using a contactless IC card according to the related art. In FIG. 7, a contactless IC card 1, installed data 2 stored in the contactless card 1, a device 3 for providing information to provide information by using the installed data 2, an access unit 4 for contactless IC card to access the installed data 2 stored in the contactless IC card 1, a data processing unit 5 for creating information based on the obtained installed data, which is to be provided by the device 3 for providing information and a user interface unit 6 for outputting the information to be provided by the device 3 for providing information.

The information which can be provided in the above-stated configuration is the installed data 2 themselves stored in the contactless IC card 1 or information created from the installed data by the data processing unit 5.

As stated, desired data are stored in the contactless IC card 1. Therefore, there are following problems. For example, a case of providing information including mass data, e.g., movie and a case of providing information created dynamically, e.g., real-time image are assumed. In these cases, it becomes necessary to mount a mass memory in the contactless IC card or add a camera and an encoder for creating the real-time image in the system. This causes an increase in cost.

Further, a case where the desired data which are stored in the contactless IC card become old and a case where the desired data are wrong are assumed, for example. Originally, the data should be updated in these cases. However, it is actually impossible to update the data stored in the IC card which has been distributed already. Further, it is troublesome to write data again in a multiplicity of contactless IC cards after the data have been stored in the cards.

Japanese Patent Application Publication 2000-76399 describes an example of a system assuming the above-stated technique.

This invention is intended to solve the above-stated problem in the related art. It is an object of the invention to become able to obtain mass data and data created dynamically by storing location information in the contactless IC card for accessing the desired data, reading the location information in the device for providing information and accessing the desired data based on the read location information and further to solve troublesome work of updating the data in the contactless IC card.

DISCLOSURE OF THE INVENTION

A method for providing information according to this invention is a method for providing information using a contactless IC (integrated circuit) card and a device for providing information. The method for providing information includes following elements:

(1) a step of accessing the contactless IC card and reading data of location information including only link information indicating a location where data of external information exist by the device for providing information, (2) a step of extracting the data of external information based on the link information included in the data of location information read through a network by the device for providing information, (3) a step of creating data for a user, which can be understood by the user, by using at least a part of the data of external information by the device for providing information, and (4) a step of outputting the data for the user by the device for providing information.

A method for providing information according to this invention is a method for providing information using a contactless IC (integrated circuit) card and a device for providing information. The method for providing information includes following elements:

(1) a step of accessing the contactless IC card and reading data of location information including link information indicating a location where data of external information exist by the device for providing information, (2) a step of creating information for prompting selection of the link information included in the data of location information read by the device for providing information, (3) a step of outputting the information for prompting selection by the device for providing information, (4) a step of inputting selection information of the link information by the device for providing information (5) a step of extracting the data of external information based on the link information specified by the selection information through a network by the device for providing information, (6) a step of creating data for a user, which can be understood by the user, by using at least a part of the data of external information by the device for providing information, and (7) a step of outputting the data for the user by the device for providing information.

The method for providing information further includes a step of executing a program included in the data of external information extracted. The data for the user are created based on an execution result of the program.

The contactless IC card is provided in a product, a package of the product or goods related to the product. The method for providing information includes a step of extracting information on the product as the data of external information.

The method for providing information includes a step of extracting information related to a product as the data of external information and a step of extracting information for prompting a settlement procedure related to purchase of the product as the data of external information.

The contactless IC card is set in a specific area, and the method for providing information includes a step of extracting location information of the specific area as the data of external information.

The method for providing information further includes a step of specifying a location of the user based an access history to the link information in the data of location information stored in the contactless IC card by using a database which manages information on a location where the contactless IC card is set by a server which manages the data of external information.

The contactless IC card is provided in a calling card. The method for providing information includes a step of extracting at least one of information on a person indicated on the calling card and information on an organization which the person belongs to as the data of external information.

The contactless IC card is provided in a giveaway for advertisement. The method for providing information includes a step of extracting information related to a target for the advertisement as the data of external information.

A device for providing information according to this invention includes following elements:

(1) an access unit for contactless IC card for accessing a contactless IC (integrated circuit) card and reading data of location information including only link information indicating a location where data of external information exist, (2) an access unit for location for extracting the data of external information based on the link information included in the data of location information read through a network, (3) a data processing unit for creating data for a user, which can be understood by the user, by using at least a part of the data of external information, and (4) an information output unit for outputting the data for the user.

A device for providing information according to this invention includes an access unit for contactless IC card for accessing the contactless IC (integrated circuit) card and reading data of location information including link information indicating a location where data of external information exist, a data processing unit for creating information for prompting selection of the link information included in the data of location information read, an information output unit for outputting the information for prompting selection, an operation input unit for inputting selection information of the link information, and an access unit for location for extracting the data of external information based on the link information specified by the selection information through a network. The data processing unit further creates data for a user, which can be understood by the user, by using at least a part of the data of external information. The information output unit further outputs the data for the user.

BRIEF DESCRIPTION OF THE DRAWINGS

FIG. 4 shows a configuration chart of the system in a case of applying to a service for providing location information.

FIG. 5 shows a configuration chart of the system in a case of applying to a calling card.

FIG. 6 shows a configuration chart of the system in a case of applying to advertisement.

FIG. 7 shows a configuration chart of an information access system by using a contactless IC card in the related art.

BEST MODE FOR CARRYING OUT THE INVENTION

Embodiment 1

Figure 1:
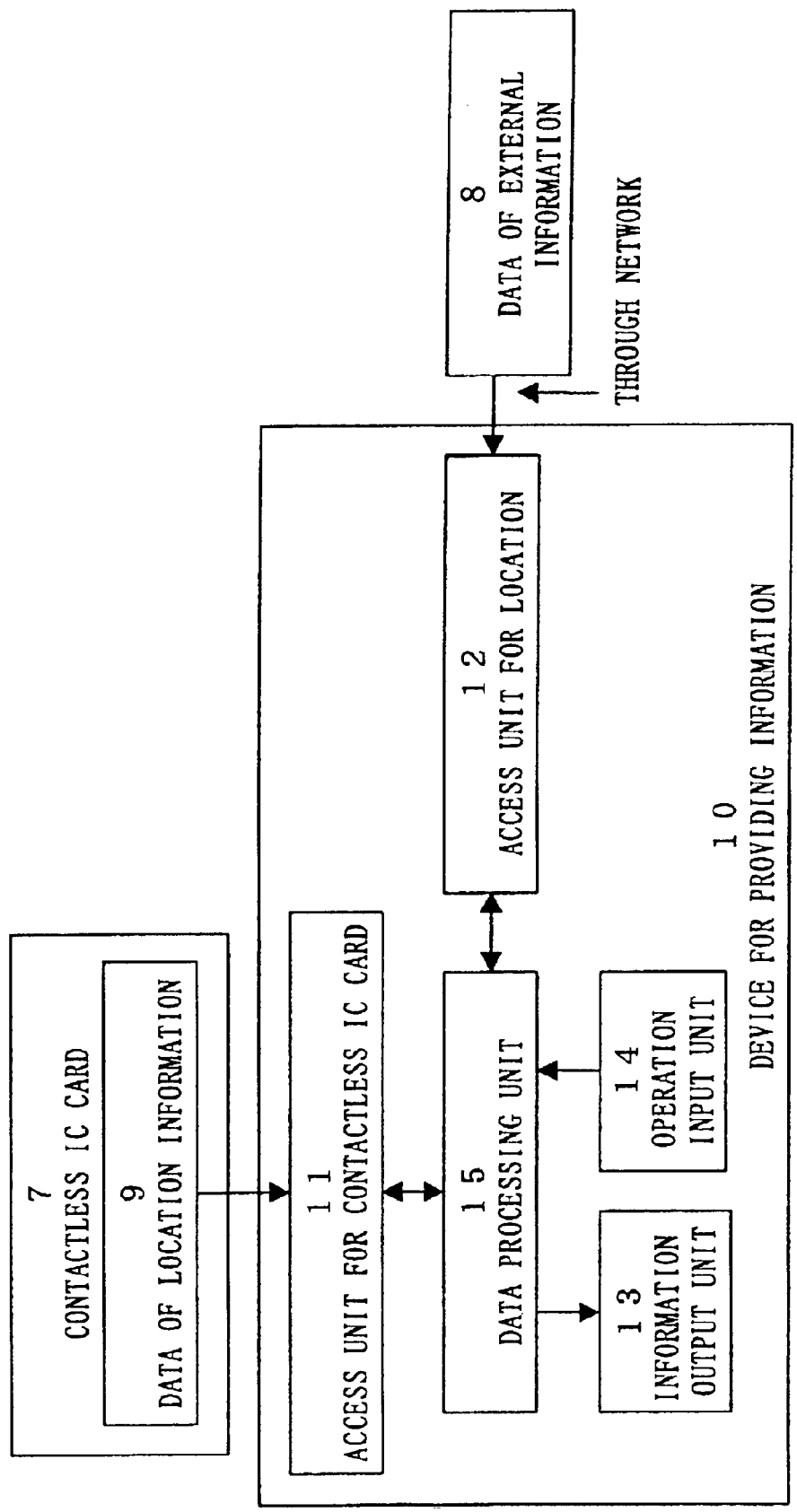
FIG. 1 illustrates an example of a configuration of a system.

In the following, this invention is explained based on embodiments illustrated in drawings. FIG. 1 illustrates an example of a configuration of a system.

A contactless IC card 7 and data 8 of external information existing in an outside of the contactless IC card 7 are illustrated. As the data 8 of external information, there are dynamic data, e.g., real-time image, static data which are created in advance, program, etc. Data 9 of location information are illustrated. The data 9 of location information are structured to specify link information for accessing the data 8 of external information. The data 9 of location information can be either the link information itself or information including the link information. The link information is data indicating an existing location of the data 8 of external information in a network. The link information itself is URL (Uniform Resource Locator), for example. The information including the link information is HTML (Hyper Text Markup Language) document including URL, for example.

A device 10 for providing information provides information obtained from the data 8 of external information for the user by using the data 9 of location information stored in the contactless IC card 7. The device 10 for providing information includes the following components 11–15.

An access unit 11 for contactless IC card accesses the data 9 of location information stored in the contactless IC card 7.

An access unit 12 for location accesses the data 8 of external information by using the data 9 of location information. For example, when the link information is URL, the access unit 12 for location includes a mechanism for accessing Internet and accessing contents. Regarding this mechanism, it is possible to adopt a method which is currently used. For example, there are a method of i-mode (Registered Trademark) used in cellular phones and a method of HTTP (Hyper Text Transfer Protocol) through ISP (Internet Service Provider), which is used in PDA (Personal Digital Assistants) and PC (Personal Computer).

An information output unit 13 outputs various information to the user. As a format of the information provided for the user by the information output unit 13, there are a static image, a dynamic image, voice, music, text, etc., for example.

An operation input unit 14 receives an operation from the user. In the following example, a pointing device is used as the operation input unit. However, other input devices, e.g., a keyboard, a pen, etc. can be used.

A data processing unit 15 creates information for the user from the data 8 of external information or the data 9 of location information and further performs processing corresponding to an input from the user. When the data 8 of external information are a program, the data processing unit 15 executes the program.

Figure 2:
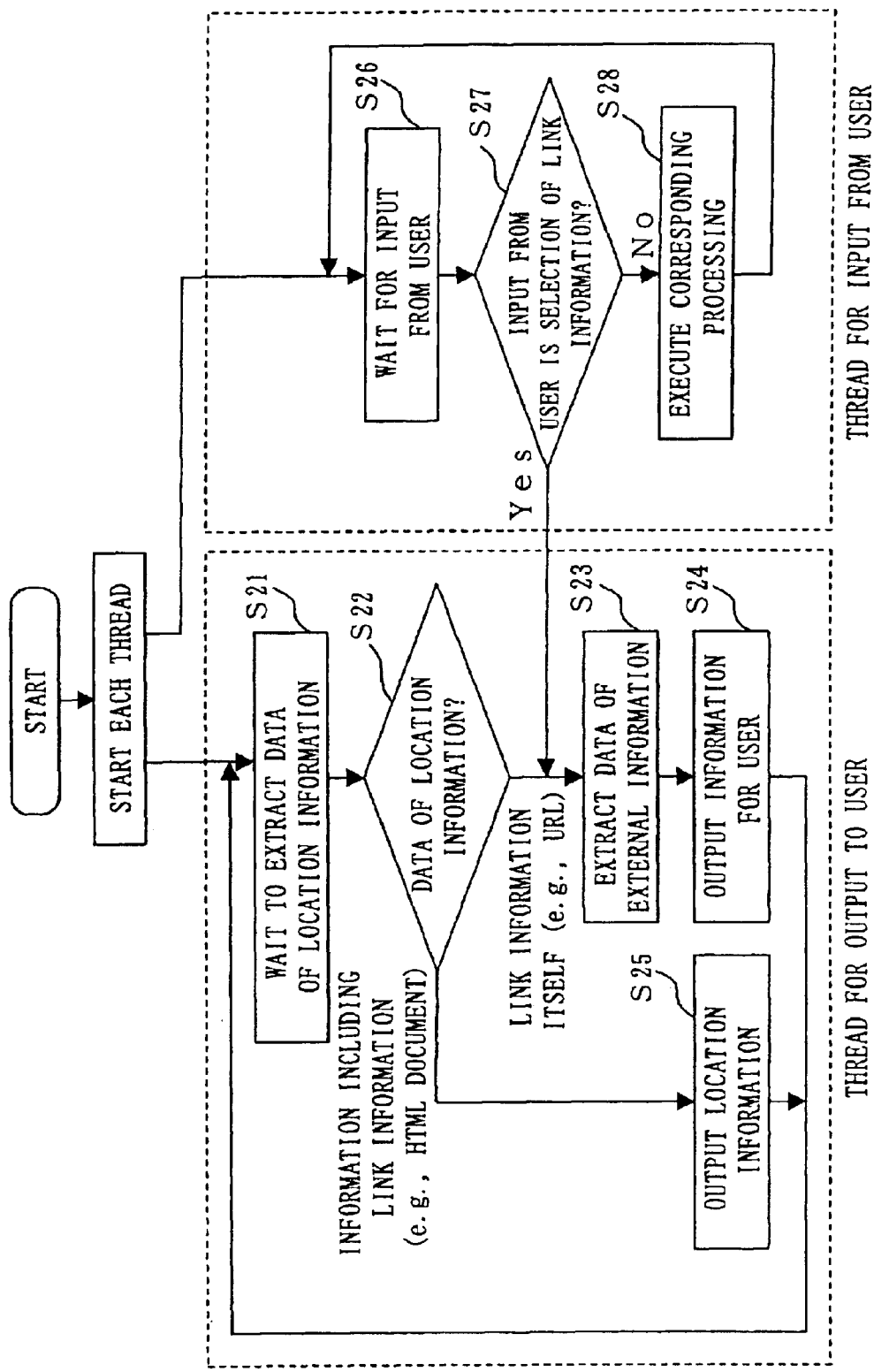
FIG. 2 shows a flow chart of processing of providing various information for a user by using a contactless IC card.

Next, a method for providing various information for the user by using the contactless IC card 7 is explained. FIG. 2 shows a flow chart of processing of providing various information for the user by using the contactless IC card 7.

At first, the device 10 for providing information extracts the data 9 of location information stored in the contactless IC card 7 by using the access unit 11 for contactless IC card (S21), and sends them to the data processing unit 15.

Specifically, the access unit 11 for contactless IC card is a reader/writer for contactless IC card. Basically, the access unit 11 for contactless IC card can be either attached externally to or packaged in the device 10 for providing information. However, when the device 10 for providing information is used for a mobile purpose, it is desirable to be packaged.

Next, the data processing unit 15 checks if the data of location information are the link information itself for accessing the data 8 of external information (for example, URL) or the information including the link information (for example, HTML document) (S22).

After checking, when the data 9 of location information are the link information itself, the device 10 for providing information extracts the data 8 of external information by using the access unit 12 for location (S23). Then, the data processing unit 15 converts the data 8 of external information extracted into information (in a format of HTML document, for example) which can be understood by the user, and sends the information to the information output unit 13 as information for the user. The information output unit 13 displays the information for the user, which has been sent (S24). In this way, various information is provided for the user. When the data 8 of external information are a program, the data processing unit 15 executes the program, and provides the various information for the user based on a result of execution.

Meanwhile, when the data 9 of location information are the information including the link information, the data processing unit 15 converts the information into information (in a format of HTML document, for example) which can be understood by the user, and sends the information to the information output unit 13. The information output unit 13 displays the information which has been sent (S25). In this way, the information (for example, HTML document) for selecting the link information to the desired information is provided. Specifically, this information prompts the user to select the link information.

At this point, a thread for input is waiting for an input from the user (S26). The user selects the link information from the provided information (S27). For example, when this information is the HTML document, a pointing device which is the operation input unit 14 specifies a link information part displayed in a display device which is the information output unit 13.

The Selected information is sent from the operation input unit 14 to the data processing unit 15. Then, the data processing unit 15 extracts the data 8 of external information based on the selected link information by using the access unit 12 for location (S23). The data processing unit 15 converts this into information (in a format of HTML document, for example) which can be understood by the user, and sends it to the information output unit 13 as the information for the user. The information output unit 13 displays the information for the user, which has been sent (S24). In this way, the desired information is provided for the user.

As stated, the various information can be provided for the user by using the contactless IC card.

Embodiment 2

Figure 3:
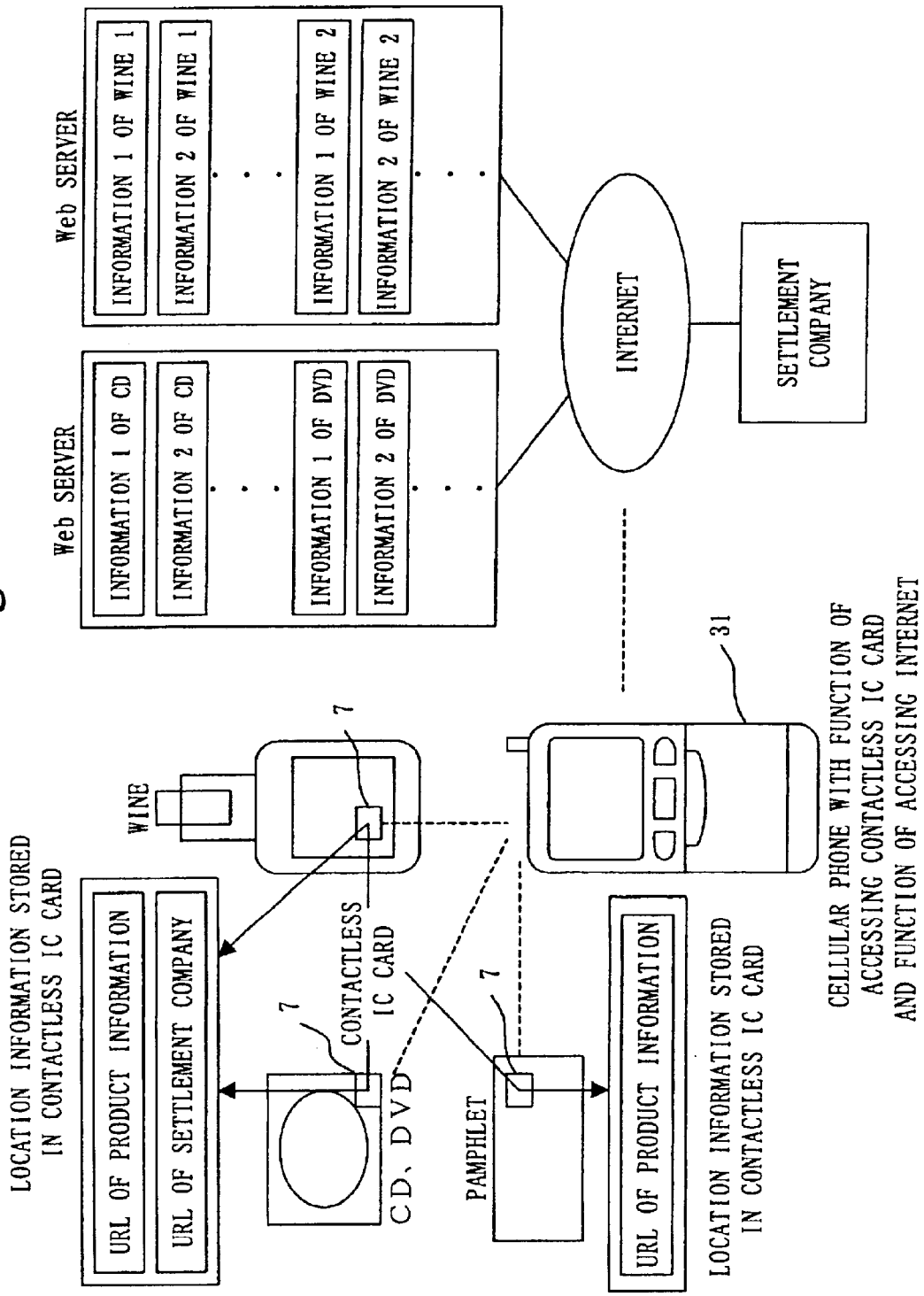
FIG. 3 shows a configuration chart of the system in a case of applying to a service for providing product information.

Next, an example of application is explained. FIG. 3 shows a configuration chart of the system in a case of applying to a service for providing product information.

The contactless IC card 7 stores URL for the product information. Further, the contactless IC card 7 is provided in a main part of a product, a package, a label, a pamphlet for introducing the product, etc. The contactless IC card 7 is stuck on or embedded in them. The label and the pamphlet for introducing the product are examples of goods relating to the product.

As the device 10 for providing information, a cellular phone 31 with a function of accessing the contactless IC card and a function of accessing Internet is used. The cellular phone 31 extracts the URL for the product information, extracts the product information which is the data of external information based on the URL, and provides it for the user.

As illustrated in FIG. 3, when the product is CD or DVD, it is possible that an introduction of music or video image stored in the medium is included in the product information, for example.

Further, it is also effective to store URL for HP of a settlement company in the contactless IC card 7. When the user purchases a product, the user can go through the settlement procedure by accessing the HP of the settlement company based on the URL from the cellular phone. Specifically, the data of external information are the HTML document constituting the HP of the settlement company, and the document is configured to prompt the user to go through the settlement procedure.

Embodiment 3

FIG. 4 shows a configuration chart of the system in a case of applying to a service for providing the location information.

In the contactless IC card 7, URL for information on that area, URL for a map of the area, etc. are stored. The contactless IC card 7 is provided on a wall of a building or a bulletin board, etc. The location information, e.g., area information, map information, etc. is provided for the user in a same method with the stated case of the service for providing the product information.

Further, in addition to the area information and the map information, route information, caution information, weather information, etc. can be provided for the user as the location information by setting the contactless IC card on a tree or a sign board on a side of a path for trekking and mountaineering. Since the sign board in a mountain, etc. is not maintained in many cases, there are cases when the information is old or cannot be seen. Therefore, it is effective to provide the information by using the contactless IC card. Especially, it is effective as it is unnecessary to update the information in the contactless IC card and it is sufficient to update information in a Web server.

Further, it is also possible to specify a location of the user by providing a database for managing information on a location where the contactless IC card is set and checking an access history to URL stored in the contactless IC card by the Web server. This is useful for finding a location of a lost person, for example.

Embodiment 4

FIG. 5 shows a configuration chart of the system in a case of applying to a calling card. The contactless IC card 7 is provided in the calling card. In the contactless IC card 7, URL for detail information about a person indicated on the calling card, URL for information on a company which the person belongs to, etc. are stored. The company is an example of an organization which the person belongs to. Then, person information, company information, etc. is provided for the user in a same method with the stated case of the service for providing the product information.

Embodiment 5

FIG. 6 shows a configuration chart of the system in a case of applying to advertisement. The contactless IC card 7 is provided in a giveaway for advertisement, e.g., pocket-tissue or a leaflet distributed on the street. In the contactless IC card 7, URL for advertisement information is stored. The advertisement information is provided for the user in a same method with the stated case of the service for providing the product information.

In the explanation of the above-stated example of application, the cellular phone is used as the device 10 for providing information. However, it is not limited to the cellular phone. It is sufficient as far as the device 10 for providing information includes a function of accessing the contactless IC card, a function of accessing based on the link information, a function of outputting the information and a function of inputting operation from the user. Therefore, a PDA, a PC and a specialized device including these functions may be used, for example.

Industrial Applicability

In the stated method, the various information can be provided for the user by using the contactless IC card. Information including mass data, e.g., dynamic image, information, e.g., real-time image created dynamically, etc. can be provided, for example.

Further, even when information which the user wants to provide becomes old or the information has been wrong, the information is updated easily. Specifically, processing of updating the contactless IC card is not necessary. It is sufficient to update the data of external information stored externally, e.g., in the Web server. Further, when information provided by the multiplicity of contactless IC cards is updated, processing of rewriting each of the multiplicity of contactless IC cards becomes unnecessary.

What is claimed is:

1. A method for providing information using a contactless IC (integrated circuit) card that is attached externally or internally to an information medium and a device for providing information, the method for providing information comprising:

(1) a step of accessing the contactless IC card and reading data of location information including only link information indicating a location where data of external information exist by the device for providing information;

(2) a step of extracting the data of external information based on the link information included in the data of location information read through a network by the device for providing information;

(3) a step of creating data for a user, which can be understood by the user, by using at least a part of the data of external information by the device for providing information; and (4) a step of outputting the data for the user by the device for providing information.

2. A method for providing information using a contactless IC (integrated circuit) card that is attached externally or internally to an information medium and a device for providing information, the method for providing information comprising:

(1) a step of accessing the contactless IC card and reading data of location information including link information indicating a location where data of external information exist by the device for providing information;

(2) a step of creating information for prompting selection of the link information included in the data of location information read by the device for providing information;

(3) a step of outputting the information for prompting selection by the device for providing information;

(4) a step of inputting selection information of the link information by the device for providing information (5) a step of extracting the data of external information based on the link information specified by the selection information through a network by the device for providing information;

(6) a step of creating data for a user, which can be understood by the user, by using at least a part of the data of external information by the device for providing information; and (7) a step of outputting the data for the user by the device for providing information.

3. The method for providing information of claim 1 or 2, further comprising a step of executing a program included in the data of external information extracted, wherein the data for the user are created based on an execution result of the program.

4. The method for providing information of claim 1 or 2, wherein the contactless IC card is provided in a product, a package of the product or goods related to the product, the method for providing information comprising a step of extracting information on the product as the data of external information.

5. The method for providing information of claim 1 or 2, comprising:

a step of extracting information related to a product as the data of external information; and a step of extracting information for prompting a settlement procedure related to purchase of the product as the data of external information.

6. The method for providing information of claim 1 or 2, wherein the contactless IC card is set in a specific area, the method for providing information comprising a step of extracting location information of the specific area as the data of external information.

7. The method for providing information of claim 6, further comprising a step of specifying a location of the user based an access history to the link information in the data of location information stored in the contactless IC card by using a database which manages information on a location where the contactless IC card is set by a server which manages the data of external information.

8. The method for providing information of claim 1 or 2, wherein the contactless IC card is provided in a calling card, the method for providing information comprising a step of extracting at least one of information on a person indicated on the calling card and information on an organization which the person belongs to as the data of external information.

9. The method for providing information of claim 1 or 2, wherein the contactless IC card is provided in a giveaway for advertisement, the method for providing information comprising a step of extracting information related to a target for the advertisement as the data of external information.

10. A device for providing information comprising:

(1) an access unit for contactless IC card for accessing a contactless IC (integrated circuit) card that is attached externally or internally to an information medium and reading data of location information including only link information indicating a location where data of external information exist;

(2) an access unit for location for extracting the data of external information based on the link information included in the data of location information read through a network;

(3) a data processing unit for creating data for a user, which can be understood by the user, by using at least a part of the data of external information; and (4) an information output unit for outputting the data for the user.

11. A device for providing information comprising:

an access unit for contactless IC card for accessing a contactless IC (integrated circuit) card that is attached externally or internally to an information medium and reading data of location information including link information indicating a location where data of external information exist;

a data processing unit for creating information for prompting selection of the link information included in the data of location information read;

an information output unit for outputting the information for prompting selection;

an operation input unit for inputting selection information of the link information; and an access unit for location for extracting the data of external information based on the link information specified by the selection information through a network, wherein the data processing unit further creates data for a user, which can be understood by the user, by using at least a part of the data of external information, wherein the information output unit further outputs the data for the user.

* * * * *